(No Model.)

O. CLOSE.
CHILD'S CARRIAGE.

No. 258,219.                    Patented May 23, 1882.

WITNESSES:
Fred. G. Dieterich

INVENTOR.
Oscar Close,
by A. Snow & Co.
ATTORNEYS.

N. PETERS, Photo-Lithographer, Washington, D. C.

UNITED STATES PATENT OFFICE.

OSCAR CLOSE, OF WORCESTER, MASSACHUSETTS.

CHILD'S CARRIAGE.

SPECIFICATION forming part of Letters Patent No. 258,219, dated May 23, 1882.

Application filed March 20, 1882. (No model.)

*To all whom it may concern:*

Be it known that I, OSCAR CLOSE, of Worcester, in the county of Worcester and State of Massachusetts, have invented certain new and useful Improvements in Vehicles; and I do hereby declare that the following is a full, clear, and exact description of the invention, which will enable others skilled in the art to which it appertains to make and use the same, reference being had to the accompanying drawings, which form a part of this specification.

Figure 1:
Figure 2:
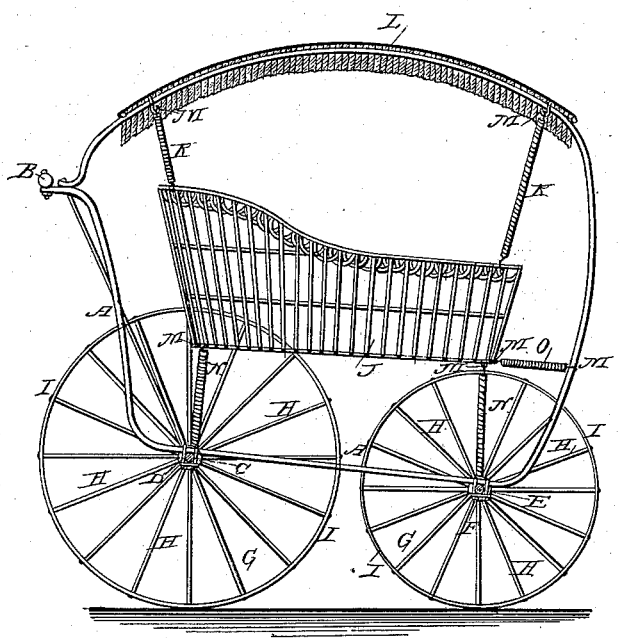

Figure 1 is a perspective view of a perambulator embodying my improvements, and Fig. 2 is a longitudinal vertical sectional view of the same.

Similar letters of reference indicate corresponding parts in both figures.

This invention relates to vehicles; and it consists in certain improvements in the construction of the same, applicable alike to all kinds of road-carriages, baby-carriages, and the like, as will be hereinafter fully described, and particularly pointed out in the claims.

In the drawings hereto annexed my invention is shown as applied to a perambulator or baby-carriage. The frame consists of two stout metallic rods or bars, A A, which, starting at the handle B, are curved gradually in a downward direction until they reach the rear axle, C, to which they are firmly secured by clips D. From thence they extend straight forward to the front axle, E, to which they are likewise secured by clips F, and from thence they are gradually curved in an upward and rearward direction until they reach the handle B, where the ends are firmly connected and secured.

The frame rods or parts A A, it will be observed, are spaced or kept a suitable distance apart by the handle B and axles C E.

The axles are mounted on wheels G, which are made entirely of metal—iron or steel, or both—the spokes H being shouldered or tenoned at their inner ends to enter the mortises in the hub (or they may be cast with the latter) and at their outer ends to support the tire I, which is secured by clinching or riveting the ends of the spokes.

The body J of the carriage may be made of any suitable material; but I prefer to make it entirely of woven wire in imitation of wicker or basket work. It may thus be made exceedingly light and durable. The body is supported by the arched frame-bars A A by means of coiled springs K, attached to said frame-bars and to the four corners of the body. The springs may be provided at their upper ends with adjusting-links to enable the body to be raised or lowered, as desired.

A top or awning, L, consisting of a frame covered with suitable material, is to be secured permanently or adjustably upon the arched frame A A. In the drawings hereto annexed I have shown it permanently secured and provided at its four corners with hooks M, upon which the springs K are hung or adjusted, instead of direct upon the bars A.

Braces consisting of coiled springs N connect the center of the under side of the body with the ends of the axles. This is to prevent the body from swaying. Likewise, and for the same purpose, either or both ends of the body may be connected with the frame-bars A by coiled springs O.

The operation and advantages of my invention will be readily understood. The body J, being supported by the springs K from the arched bars A, rides easily and entirely without jolting.

When my invention is to be applied to the construction of road-wagons, the bars A are simply curved or arched from the axles and the handle B is omitted. Other necessary modifications will readily suggest themselves.

Having thus described my invention, I claim and desire to secure by Letters Patent of the United States—

1. In a vehicle, the frame-bars A A, supported upon and connecting the axles and arched over the body, as set forth.

2. In a vehicle, the combination, with the frame-bars A A, supported upon and connecting the axles and arched over the body, of the handle B, which connects the free ends of said frame-bars, as set forth.

3. The combination, with the frame-bars A A, supported upon and connecting the axles, arched as shown, and having their free ends connected, of the body J, suspended under the said arched frame-bars by springs K, as set forth.

4. The combination of the arched frame-bars

A A, supported upon and connecting the axles C E, the body J, the suspension-springs K, and the brace-springs N O, as set forth.

5. The combination of the arched frame-bars A A, the top or awning L, having hooks M, the body J, and the adjustable suspension-springs K, as set forth.

In testimony that I claim the foregoing as my own I have hereto affixed my signature in presence of two witnesses.

OSCAR CLOSE.

Witnesses:
H. M. CLEMENCE,
GEORGE Y. LANCASTER.